United States Patent Office 3,346,540
Patented Oct. 10, 1967

3,346,540
PROCESS FOR THE PRODUCTION OF FORMALDE-
HYDE-CYCLIC FORMAL COPOLYMERS
Tamotsu Eguchi and Junnosuke Yamauchi, Kurashiki,
Japan, assignors to Kurashiki Rayon Company Limited,
Kurashiki, Japan, a corporation of Japan
No Drawing. Filed June 15, 1964, Ser. No. 375,385
Claims priority, application Japan, June 20, 1963, 38/259
4 Claims. (Cl. 260—67)

This invention relates to a process for the production of a novel formaldehyde copolymer particularly by copolymerizing cyclic formal and formaldehyde in the presence of an acidic catalyst.

The object of the invention is to provide a high molecular weight formaldehyde copolymer which provides fibers, plastics and films, having superior thermal stability, high chemical resistance, excellent mechanical properties (especially, high tensile strength, excellent toughness and high modulus).

Polyoxymethylene that has been widely used as plastics and fibers is a homopolymer of formaldehyde. This is produced by polymerization of formaldehyde, followed by etherification or esterification of the hydroxyl group as the terminal group with an etherification or esterification agent. If only formaldehyde is polymerized, the stabilization of the terminal group is indispensable. The stabilization itself takes a great deal of time and money due to the additional chemicals, polymer washing and stabilizing apparatus, and furthermore causes a loss often several percent of the polymer charge for the treatment due to the depolymerization thereof. Since the main chain of the stabilized polymer molecule consists of recurring —$CH_2$—O— units (this polymer is designated as polyoxymethylene), the following defects resulting from such structure cannot be avoidable. That is, this polymer is apparently stable, but due to the irradiation of ultraviolet ray, oxidation in air, high temperature heating and immersion in alkalis, the deesterification or deetherification of the terminal group and the oxidative fission of the chain occur and subsequently a rapid depolymerization reaction occurs from that part, resulting in releasing formaldehyde monomers. Consequently, moldings of this polymer cannot be used widely.

In order to overcome such defects in the production of the formaldehyde polymer and in the product itself, the inventors have improved the polymer by copolymerizing formaldehyde and cyclic formal thereby to introduce a different linkage (four carbon atoms bonded group) formed by the ring-opening of the cyclic formal into the polyoxymethylene group. As a consequence it can be found that such improved polyoxymethylene can be produced at lower cost because of that the stabilization of the terminal group is not necessary and can be found a wide use because of its high heat resisting property, as compared with the known polyoxymethylene.

The term "acidic catalyst" in this specification means metal halides of Lewis acid type such as boron trifluoride, boron trifluoride ethyl-etherate, ferric trichloride, tin tetrachloride, titanium tetrachloride, aluminum trichloride, a complex compound formed between such metal halide and a weak basic compound such as amine or ether, a mineral acid such as sulfuric acid and hydrochloric acid, organic acid such as formic acid and trifluoroacetic acid and acidic material such as p-toluene sulfonic acid.

The term "cyclic formal" in this specification means a cyclic formal selected from a structure of seven membered ring or more (I) and a structure of eight membered ring or more (II).

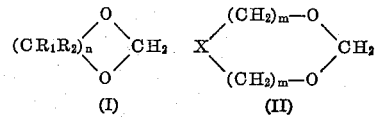

In the structure I, $R_1$ and $R_2$ designate hydrogen, alkyl group, halogen substituted alkyl group, aryl group and halogen substituted aryl group respectively and $n$ is an integer of four or more. Examples of the structure I are 1,4-butanediol formal, 1,5-pentanediol formal and 1,6-hexanediol formal.

In the structure II, X designates O, S, NH or NR in which R is alkyl group and $m$ is an integer of two or more. Examples of the structure II are diethylene glycol formal, $\gamma$, $\gamma'$-dioxy-dipropylsulfo formal and N-methyl bis($\beta$-oxyethyl)amine formal.

These cyclic formals can be produced by dehydrating reaction of linear glycol and formaldehyde. In the invention, the proportion of the cyclic ether contained in the copolymer is 0.1–20 to 100 —$CH_2O$— units, and in particular the preferred portion is 0.5–3.0.

The polymerization reaction of the invention is carried out by contacting an acidic catalyst, cyclic formal and formaldehyde simultaneously. The catalyst and two monomers may be in gaseous or liquid state. The use of a suitable inert liquid medium may assist the smooth simultaneous contact of the acidic catalyst and two monomers and, in addition, may facilitate to take out the produced polymer. Such inert liquid mediums are benzene, xylene, toluene, ethers, chloroform, methylene chloride and a hydrocarbon solvent having a slight solubility for formaldehyde such as hexane and heptane. This solvent does not react with the acidic catalyst and monomers during the polymerization and may be a non-solvent for the produced copolymer.

A polymerization system or process for carrying out the invention may be any one of contacting the catalyst and two monomers simultaneously. Therefore, as the polymerization system, a batch system, continuous system, fluidizing system, vibrating system and wetted wall tower system may be employed, and as the polymerization process, a vapor phase process, solution process, suspension process, bubbling process, high pressure process and bulk process may be employed. Several types of polymerization reactors can be employed in accordance with the polymerization system or process, as illustrated hereinafter. That is a system which comprises supplying continuously a catalyst and cyclic formal in a gaseous suspended state (for example, spraying in aerosol by use of a small amount of a solvent such as hydrocarbon) to a polymerization reactor, at the same time introducing gaseous formaldehyde thereinto continuously thereby to carry out copolymerization in gaseous phase, and discharging the copolymer powder fallen from the lower part of the polymerization reactor, a system which comprises supplying a toluene solution of formaldehyde and cyclic ether continuously to a polymerization reactor, at the same time introducing a toluene solution of a catalyst thereinto continuously thereby to carry out solution polymerization and discharging the resultant slurry of the copolymer, or a system which comprises supplying a toluene solution of a catalyst and cyclic formal to a polymerization reactor equipped with a stirrer, in which a solvent such as toluene is charged, at the same time introducing gaseous formaldehyde continuously into the reactor to carry out copolymerization in the toluene solvent and discharging the resultant slurry of the copolymer from the reactor.

The polymerization reaction of the invention may be carried out at a suitable temperature. The temperature used practically is from —100° C. to +100° C. In particular, when the solution polymerization using a solvent is carried out, it is preferred to select a temperature sufficient to keep the system at a stable liquid state in accordance with the solubility of formaldehyde. The copolymerization reaction of the invention is ordinarily carried out at atmospheric pressure and may be carried out at above or below atmospheric pressure. The two monomers used must be purified previously and, in particular, chain transfer agents such as water and methanol must be removed as far as possible.

The process for the copolymerization by the invention is much superior to those of the prior art, as illustrated hereinafter.

1.—Thermal stability and alkali resistance property of the copolymer

The first order thermal decomposition velocity constant of the polymer at 222° C. is designated as $K_{222}$, which unit is represented by percent/minute. When the ring of the cyclic formal represented by the structure I described hereinbefore is opened and copolymerized, four or more carbon atoms linked groups are introduced, resulting in improving the thermal stability as evident from the Table 1. Similarly when the cyclic formal represented by the structure II is used, two carbon atoms linked groups are introduced into the chain.

As evident from the above table, the value of $K_{222}$ (after purifying the crude copolymer) is ordinarily less than 0.01%/min. and therefore a much more excellent thermal stability can be expected than the conventional polyoxymethylene. When the structure I and II are introduced into the chain, the acid and alkali resistance are remarkably improved and the deterioration of the mechanical property is not observed even if immersed in an aqueous solution having pH 4 or 11 for three months. (Its value is less than 1/100 of that of the conventional formaldehyde polymer.)

2.—Copolymerization reactivity

When the cyclic formal of the invention is used, the copolymerization reaction with formaldehyde can proceed substantially. The yield of the copolymer is high and the conversion of homopolymerization of the cyclic formal is as little as can be neglected. That is, it is made clear by the analysis of the copolymer that the cyclic formal of the invention is effectually consumed only for the production of the copolymer under a wide condition and furthermore the produced copolymer is not a block copolymer, but a random copolymer. This will be based upon the similarity of the molecular reactivity ratio of the cyclic formal of the invention with that of formaldehyde.

When the structure I, for example, 1,4-butanediol formal is selected as a comonomer, a group of $$-C-C-C-C-O-C-$$

is consequently introduced as a different linkage. If butylene oxide is selected as the comonomer, the same different linkage must be consequently introduced. However, it is difficult to produce the random copolymer from such higher alkylene oxide as butylene oxide, as far as an acidic catalyst is used under the condition of the present invention. Its molecular reactivity ratio is lower as compared with that of formaldehyde and, in general, only the homopolymer of formaldehyde is produced.

3.—Molecular weight of the copolymer

It is evident from Table 1 that the molecular weight of the copolymer of the invention is higher than that of the known copolymer of formaldehyde with a comonomer such as alkylene oxide and the copolymer has the excellent mechanical properties than the known copolymer. It is considered that this is based upon the copolymerizing property of cyclic formal and, in addition, the easiness of the purification of cyclic formal. The cyclic formal of the structures I and II may be charged to a polymerization reactor immediately after the simple distillation without a special purification.

The following examples will illustrate the invention further in detail.

EXAMPLE 1

50 ml. of purified toluene and 15 ml. of 1,4-butanediol formal were placed in a 200 ml. 4-necked flask equipped with a stirrer, cooler at the top of which a silica gel tube for drying is provided to prevent from the moisture, thermometer and dropping funnel and the mixture was cooled to —78° C. 13.7 g. of purified liquid formaldehyde was added thereto and stirred to give a uniform transparent liquid. Then, a catalyst solution obtained by dissolving 0.1 ml. of boron trifluoride-diethyl ether complex in 50 ml. of toluene was dropwise added with stirring. The polymerization commenced at the same time as the dropwise addition of the catalyst solution and a white slurry was formed because of the deposition of the polymer. The temperature rose due to the heat of polymerization and reached —35° C. after 15 minutes since the end of the addition of the catalyst. After stirring at —35° C. for 3 hours, the product was filtered, washed with a hot aqueous solution of 5% sodium carbonate to neutralize the catalyst, with hot water, and with acetone, and dried overnight at 60 C. in vacuo to give 14.2 g. of a white powdered polymer. 10 parts of the resulting crude copolymer were introduced into 100 parts of benzyl alcohol containing 0.5% of tributylamine and held at 160° C. for 30 minutes for the purification thereof. After cooling by standing, the deposited polymer was filtered, washed with methanol and acetone, and dried overnight at 60° C. in vacuo to give 6.5 parts of a purified

TABLE 1

| No. | | Comonomer | Polymerization process | Polymerization solvent and temp. (° C) | Conversion of homopolymerization of comonomer (percent)* | Copolymer after purified | |
|---|---|---|---|---|---|---|---|
| | | | | | | $K_{222}$ (percent/min.) | $(\eta)$ (dl./g.) |
| 1 | Method of the invention. | 1,4-butanediol formal (structure I) | Solution process | Toluene, —20° C | 2 | 0.002 | 2.0 |
| 2 | | Diethyleneglycol formal (structure II) | do | do, —78° C | 3 | 0.007 | 1.6 |
| 3 | | None (homo-polymer of formaldehyde). | Bubbling process | n-Hexane, 30° C | | 1.60 | 1.6 |
| 4 | Known method | Ethylene oxide | Solution process | Toluene, —20° C | 10 | 0.010 | 1.0 |
| 5 | | Isobutylene | do | Hexane, —78° C | 15 | 0.025 | 0.4 |

*This means the value based on monomer charged.

white powdered polymer. The purifying yield was 65%.

0.5% of polyurethane and 0.5% of diphenylamine were added to the purified polymer. The value of $K_{222}$ of the mixed powder was 0.003%/min.

and 1,3-dioxolane were purified in the same manner as in Example 1. The results of the comparison examination about the thus purified copolymers are given in the following Table 2.

TABLE 2

[Properties of copolymer of formaldehyde and 1,4-butanediol formal and that of formaldehyde and 1,3-dioxolane]

| Sample | Yield of purification (percent) | Content of the formal unit in purified polymer (mol percent) | $[\eta]$ (dl./g.) of purified copolymer | Strength | $K_{222}$* (percent/min.) |
| --- | --- | --- | --- | --- | --- |
| Copolymer of 1,4-butanediol formal | 81.2 | 1.3 | 1.22 | Excellent | 0.003 |
| Copolymer of 1,3-dioxolane | 69.1 | 0.7 | 0.66 | None | 0.02 |

*First order constant of thermal decomposition velocity of purified polymer added with 0.5% of polyurethane and 0.5% of diphenylamine.

The melting point of the copolymer was 168° C. and the copolymer contained 1.2 mol percent of butanediol formal unit by the elementary analysis. When the purified copolymer powder was pressed at 190° C. and 200 kg./cm.², a tough, stiff, translucent film was given.

EXAMPLE 2

90 ml. of purified toluene and 12.5 ml. of butanediol formal were introduced into an autoclave and a small ampule including a solution of 0.1 ml. of boron trifluoride ethyl etherate in 10 ml. of toluene was introduced thereinto. The autoclave was cooled to −78° C. then 20 g. of liquid formaldehyde cooled to −78° C. was added after evacuating the inside thereof. After being closed, the autoclave was taken out of a bath of dry ice-methanol at −78° C. and left standing. When the temperature of the inside rose to room temperature, the small ampule including the catalyst was broken by oscillation. The copolymerization reaction commenced and the temperature rose to 50° C. After the oscillation of the autoclave for 1 hour, the product was discharged, filtered, washed with a hot aqueous solution of 5% sodium carbinate, hot water, and acetone, and dried at 60° C. in vacuo to give 21.1 g. of a crude copolymer. 21.1 g. of the crude copolymer was purified in the same manner as in Example 1 to give 18.2 g. of a purified copolymer. The content of butanediol formal in the purified copolymer was 1.8 mol percent by the result of the elementary analysis thereof. The intrinsic viscosity thereof in p-chlorophenol containing 2% α-pinene at 60° C. was 1.5 dl./g. The $K_{222}$ value of the mixture of the 99.0% copolymer, 0.5% of polyurethane and 0.5% of diphenylamine was 0.006%/min. and its thermal stability was much more excellent.

EXAMPLE 3

100 ml. of purified toluene, 2.5 ml. of 1,4-butanediol formal (0.0245 mol) and 0.1 ml. of $BF_3 \cdot OEt_2$ were placed in a 4-necked flask equipped with a stirrer, reflux condenser at the top of which a silica gel tube was equipped, thermometer and an inlet and the flask was immersed in water bath at 40° C. Formaldehyde gas was introduced into the flask at a rate of 20 lit./hour through an inlet, then immediately the polymerization occurred and the polymer was deposited and slurried. After the introduction of formaldehyde gas for 1 hour, the slurry was filtered, washed with a hot aqueous solution of 5% sodium carbonate to neutralize the catalyst, with hot water and with acetone, and dried at 60° C. in vacuo to give 18.3 g. of the polymer. On the other hand, 1,3-dioxolane was copolymerized with formaldehyde to give 16.0 g. of a polymer in a manner similar to that described as above except that 1.9 ml. of 1,3-dioxolane (0.0245 mol) was used in place of 2.5 ml. of 1,4-butanediol formal (0.0245 mol).

The resulting copolymer of crude formaldehyde and 1,4-butanediol formal and that of crude formaldehyde The 1,4-butanediol formal according to the invention can be copolymerized better than 1,3-dioxolane and furthermore the produced copolymer of 1,4-butanediol formal is much more excellent in the degree of polymerization, strength and thermal stability than that of 1,3-dioxolane.

EXAMPLE 4

The copolymerization was carried out under the same condition as in Example 3 except that the quantity of charging materials was changed as follows:

| | Ml. |
| --- | --- |
| Toluene | 100 |
| 1,4-butanediol formal | 1.0 |
| $BF_3 \cdot OEt_2$ | 0.1 |

Thus 21.7 g. of crude copolymer was obtained. This crude copolymer was purified in the same manner as in Example 1 and 16.4 g. of a purified copolymer was obtained.

EXAMPLE 5

The copolymerization was carried out under the same condition as in Example 3 except that the quantity of charging materials was changed as follows:

| | Ml. |
| --- | --- |
| Toluene | 100 |
| 1,4-butanediol formal | 10 |
| $BF_3 \cdot OEt_2$ | 0.1 |

Thus 20.9 g. of crude copolymer was produced. This crude copolymer was purified in the same manner as in Example 1 and 18.6 g. of a purified copolymer was obtained.

In the following Table 3, the melting points, compositions, intrinsic viscosities $[\eta]$ and $K_{222}$ values of the copolymers obtained in the examples described as above are shown:

TABLE 3

| Examples | Melting point (° C.) | 1,4-butanediol formal in purified copolymer (mol percent) | $[\eta]$ Copolymer of (dl./g.) | $K_{222}$ (percent/min.) |
| --- | --- | --- | --- | --- |
| 3 | 167–168 | 1.3 | 1.22 | 0.003 |
| 4 | 169–170 | 0.7 | 1.0 | 0.02 |
| 5 | 161.5–162.5 | 3.2 | 1.48 | 0.007 |

EXAMPLE 6

A vertical cylindrical reactor (10 cm. inner diameter and 50 cm. height) was employed. At the upper part of the reactor three inlets for gaseous formaldehyde, a catalyst and formal were provided and at the lower part thereof an outlet for a powdered copolymer and an exhaust port were provided. Gaseous formaldehyde at a rate of 20 g./hour and a solution containing 25 g. of 1,4-butanediol formal per 1000 ml. of petroleum ether at a rate of 200 ml./hour were introduced into the reactor from the upper part thereof so as to form a gaseous suspension and at the same time gaseous boron trifluoride was introduced at a rate of 0.2 g./hour. Then the copolymerization reaction commenced immediately and copolymer granules fell to the bottom, the discharge of which was conducted periodically. The petroleum ether used was completely vaporized due to the heat of polymerization and discharged from the exhaust port at the lower part. The yield of the copolymer was substantially quantative. 5 g. of the copolymer powder taken out of the outlet were purified in the same manner as in Example 1 to give 4.1 g. of a purified copolymer. The result of the elementary analysis of the purified polymer showed that it contained 1.5 mol. percent of butanediol formal. The intrinsic viscosity thereof in p-chlorophenol containing 2% of α-pinene at 60° C. was 1.4 dl./g.

EXAMPLE 7

1,5-pentanediol formal was copolymerized with formaldehyde to produce 21.5 g. of a crude copolymer in the same manner as in Example 3 except that 2.5 ml. of 1,5-pentanediol formal were used in place of 1,4-butanediol formal of Example 3. The crude copolymer was purified in the same manner as in Example 1 to give 17.8 g. of a purified copolymer. The intrinsic viscosity of the copolymer in p-chlorophenol containing 2% of α-pinene at 60° C. was 1.2 dl./g. The $K_{222}$ of a mixture of 99.0% of the purified copolymer, 0.5% polyurethane and 0.5% diphenylamine was 0.008%/min. and the thermal stability was very excellent.

EXAMPLE 8

Formaldehyde was copolymerized with diethyl glycol formal in the same manner as in Example 1 except that 2.5 ml. of diethylene glycol formal were used in place of 2.5 ml. of 1,4-butanediol formal of Example 3 and 20.7 g. of a crude copolymer were obtained. The crude copolymer was purified in the same manner as in Example 1 to give 15.5 g. of a purified copolymer. The melting point of the purified copolymer was 170° C. and the result of the elementary analysis showed that it contained 1.2 mol percent of diethylene glycol unit. The intrinsic viscosity thereof in p-chlorophenol containing 2% of α-pinene at 60° C. was 1.3 dl./g. The $K_{222}$ of a mixture of 99.0% of the purified copolymer, 0.5% of polyurethane and 0.5% of diphenylamine was 0.007%/min. and the heat stability was good.

EXAMPLE 9

The copolymerization was carried out under the same condition as in Example 3 except that chloroform was used as copolymerization solvent in place of toluene as follows:

|   | Ml. |
|---|---|
| Chloroform | 100 |
| 1,4-butanediol formal | 2.5 |
| $BF_3 \cdot OEt_2$ | 0.1 |

Thus 21.2 g. of crude copolymer were produced. This crude copolymer was purified in the same manner as in Example 1 and 19.9 g. of a purified copolymer were obtained. The result of the elementary analysis of the purified polymer showed that it contained 2.1 mol percent of butanediol formal. This intrinsic viscosity in p-chlorophenol containing 2% of α-pinene at 60° C. was 1.5 dl./g.

What we claim is:

1. A process for the production of high molecular weight formadehyde copolymers having improved thermal stability which comprises contacting the ingredients of a mixture consisting essentially of an acidic catalyst, formaldehyde and a cyclic formal represented by the structure

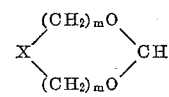

wherein X is selected from the group consisting of O, S, NH and NR in which R is lower alkyl group and $m$ is an integer selected from 2 and 3, said cyclic formal being used in the amount from 0.1 to 20 moles per 100 moles of formaldehyde.

2. A process according to claim 1, wherein the reaction is carried out at a temperature from minus 100° C. to plus 100° C.

3. A process according to claim 2, wherein the reaction is carried out in an inert liquid.

4. A process according to claim 1, wherein said acidic catalyst is selected from the group consisting of boron trifluoride, boron trifluoride ethyl-etherate, titanium tetrachloride, tin tetrachloride and aluminum trichloride.

References Cited

UNITED STATES PATENTS

| 3,194,788 | 7/1965 | Kullmar et al. | 260—67 |
| 3,197,420 | 7/1965 | Weissermel et al. | 260—2 |
| 3,256,246 | 6/1966 | Gutweiler et al. | 260—67 |

FOREIGN PATENTS

| 1,271,297 | 7/1961 | France. |
| 1,346,542 | 11/1963 | France. |

OTHER REFERENCES

Kern et al. Journal of Polymer Science, vol. 48, No. 150, pp. 399–404, December 1960.

WILLIAM H. SHORT, *Primary Examiner.*

L. M. PHYNES, *Assistant Examiner.*